F. LOWENSTEIN.
TEAPOT AND THE LIKE.
APPLICATION FILED OCT. 11, 1919.
1,413,282.
Patented Apr. 18, 1922.
2 SHEETS—SHEET 1.
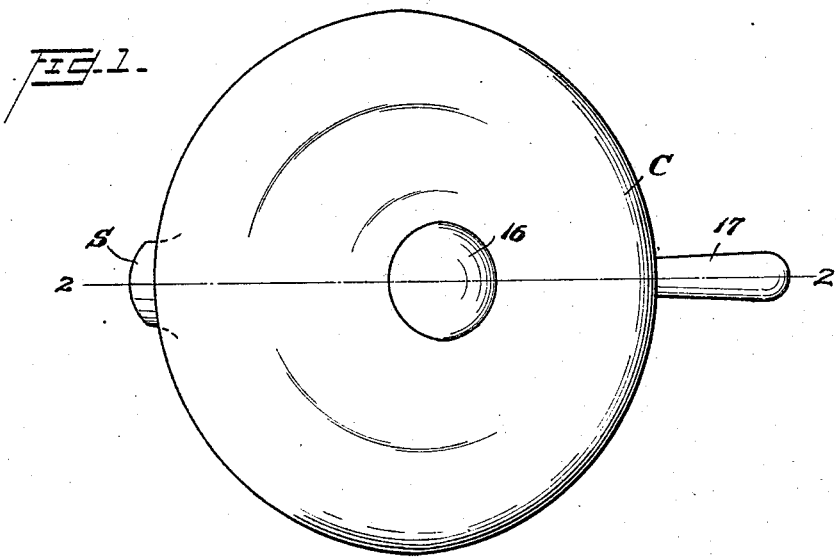
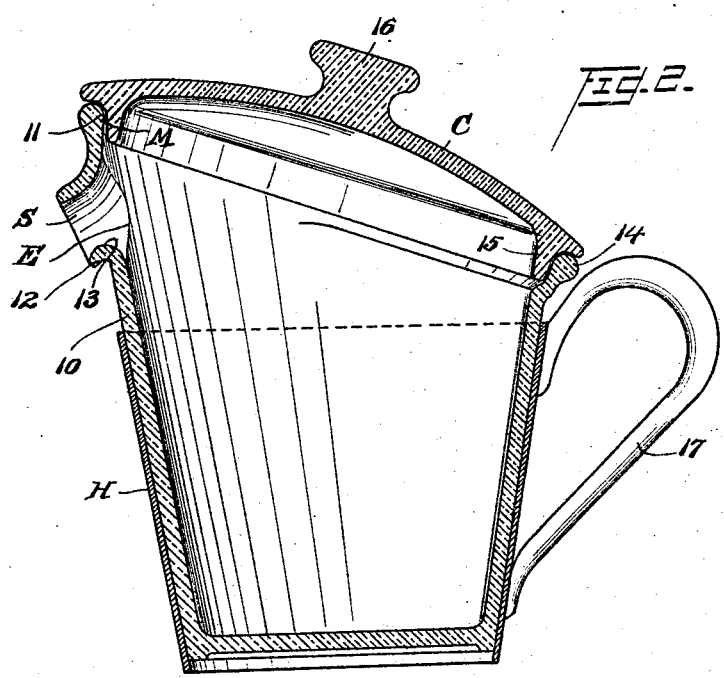
INVENTOR
FRITZ LOWENSTEIN
BY
M. C. Massie
his ATTORNEY F. LOWENSTEIN.
TEAPOT AND THE LIKE.
APPLICATION FILED OCT. 11, 1919.
1,413,282.
Patented Apr. 18, 1922.
2 SHEETS—SHEET 2.
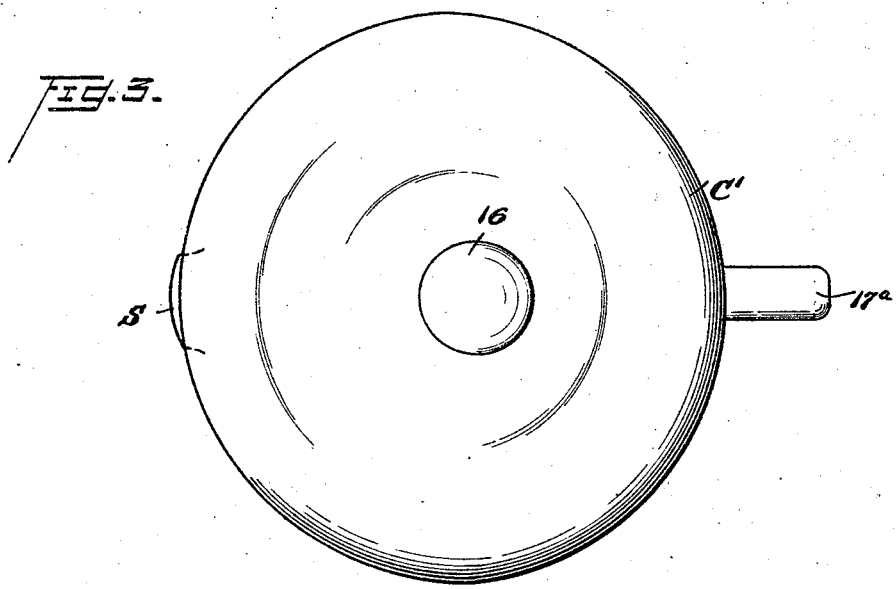
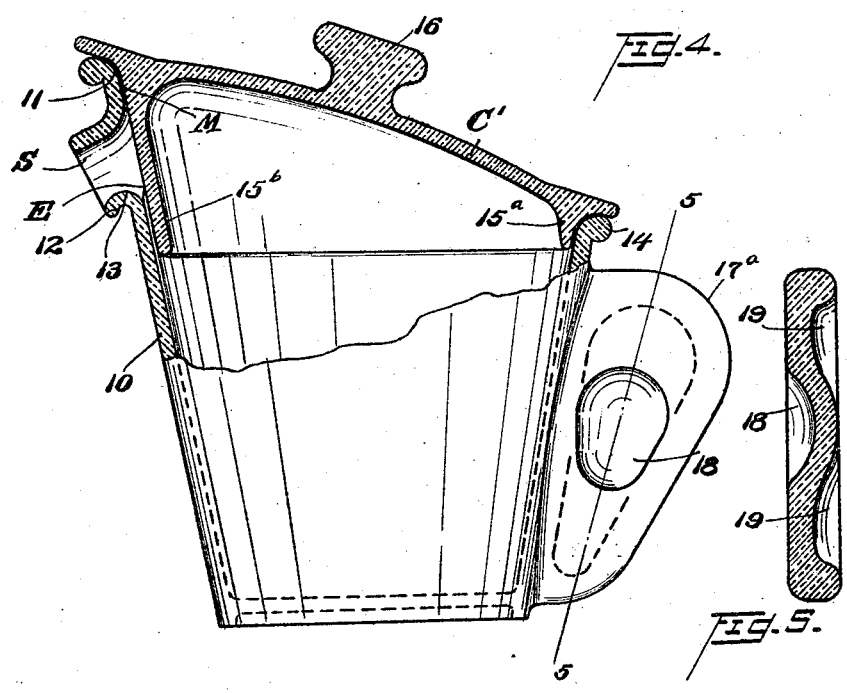
INVENTOR
FRITZ LOWENSTEIN
BY
his ATTORNEY

UNITED STATES PATENT OFFICE.

FRITZ LOWENSTEIN, OF NEW YORK, N. Y.

TEAPOT AND THE LIKE.

1,413,282. Specification of Letters Patent. Patented Apr. 18, 1922.

Application filed October 11, 1919. Serial No. 329,906.

*To all whom it may concern:*

Be it known that I, FRITZ LOWENSTEIN, a citizen of the United States, residing at New York, in the county of New York and State of New York, have invented certain new and useful Improvements in Teapots and the like; and I do hereby declare the following to be a full, clear, and exact description of the invention, such as will enable others skilled in the art to which it appertains to make and use the same.

My invention relates to teapots and the like, and has particular reference to improvements in the construction and arrangement of the cover and the pouring outlet thereof. A further feature of this invention is an improved handle especially adapted for utensils of this general character.

Many teapots, as well as chocolate and coffee pots, and the like, especially when made of earthenware or china, have covers that are loosely supported on the pot. These often drop off during the pouring, especially when the last portion of the contents is being poured. Even when the cover is hinged to the pot, there is the tendency for the cover to swing open as the pot is tilted to drain its contents.

It is an object of my invention to provide a container of the above-described character in which the cover will not drop off during the pouring operation, and in which the use of cover-fastening means may be omitted, thereby enabling ready and complete removal of the cover without manipulation. Broadly speaking, I accomplish this object by supporting the cover at such an angle on the pot that when the latter is tilted in pouring, the cover will still be disposed at an inclination to the vertical and will not slip off the pot even when the latter is tilted to a horizontal position to pour out the last drop of the contents.

In teapots heretofore proposed the pouring spout is usually connected to the pot near the base thereof and extends upwardly from the base, terminating outside the pot at a point about on a level with the top of the pot. It is difficult to thoroughly clean the spouts of such teapots, and such teapots have the further disadvantage that in emptying them, especially when they are full or nearly full, part of the contents frequently flow out through the mouth of the teapot. Furthermore, the pouring spouts of such teapots are so constructed that a drop of liquid adhering to the end of the spout tends to flow down the outside surface of the spout when the teapot is returned to its upright position.

Another object of my invention is therefore to provide a teapot or the like in which the pouring outlet is so constructed and arranged that it may be readily cleaned and that drippings at the end thereof may be prevented from flowing down the outer side of the teapot; the pouring outlet being also so constructed and arranged that the entire contents of the teapot may be poured out of said outlet with practically no danger of discharging liquid through the mouth or top of the container.

The above and other objects and the novel features of the invention will be apparent from the following description taken in connection with the accompanying drawing, in which—

Fig. 1 is a plan view of teapot embodying one form of my invention;

Fig. 2 is a vertical central section of the same, taken on the line 2—2 of Fig. 1 and Fig. 3 is a top plan view of another embodiment of my invention;

Fig. 4 is a side elevation partly in section of the same; and

Fig. 5 is a section in the line 5—5 Fig. 4.

Referring to the drawing, the teapot comprises a body portion 10 which may be of any suitable material, such as earthenware, metal, etc. In the present example the container 10 is substantially elliptical in horizontal transverse section, with the short diameter extending from front to rear. The body portion flares upwardly from the base and terminates at its upper edge in an open mouth M that is defined by the rim 11. In the construction here shown, the mouth M is symmetrical with the central vertical axis of the teapot and the plane of the mouth and the rim 11 is inclined to said axis to such a degree that the mouth is substantially circular. The highest point of the rim 11 and the mouth M is at the forward side of the vessel 10, the rim extending rearwardly and downwardly from this point.

The forward side of the vessel 10 is apertured at E to form the entrance of a relatively short spout or pouring outlet S through which the contents of the vessel may be discharged. This short chunky spout is less liable to breakage than is the ordinary teapot spout. This spout is arranged adjacent to the highest part of the container and its axis is inclined to the horizontal, the spout extending downwardly from its junction with the body portion 10, and thus having its pouring edge or lip below that of such junction. Furthermore, the under side 12 of the spout extends downwardly and away from the pot body at a sufficient angle, in this instance about 45 degrees, from the horizontal to enable it to readily shed any drop adhering thereto after pouring, and also prevent the drop from flowing down the outside of the vessel. The level of the lower edge 13 of the aperture E is higher than that of the lower edge 14 of the mouth of the vessel, so that the level of the liquid when filling the vessel may be readily observed and overflowing prevented. For cleaning purposes, the interior of the spout is readily accessible from the pouring outlet or through the mouth of the vessel. If desired, the container may be provided with a strainer at the opening E, but where a tea ball or steeping bag is used, or in the case of a chocolate pot, this is not necessary.

The cover C is substantially circular and has a circular flange 15 on its under side within its margin that fits within the rim 11 and assists in holding the cover in place. It will be observed that the cover is disposed at such an angle on the mouth of the vessel that when the latter is tilted to a substantially horizontal position, or even beyond the horizontal, the cover will still be retained in its closed position by the flange 15 and by gravity, since in such tilted position the cover is not inclined near enough to or beyond the vertical to cause it to slip off. The last drop may thus be drained from the teapot without the cover falling off. At the same time the cover is arranged so that it is readily and entirely removable without manipulation, being provided with the usual knob 16, by means of which it may be lifted off the mouth of the vessel. It will be seen that, in general, the condition for stability of the cover in a teapot of the shape illustrated is that the angle between the straight front wall at the pouring outlet and the plane of cover support shall be less than 90°.

In Figs. 3 and 4 I have illustrated a slight modification in which the cover C′ has a depending flange 15ª of such depth on one side of the cover, as indicated at 15ᵇ, that in the position here shown, the flange extends down over the entrance E of the spout and to a point below the edges 13 and 14, thus practically sealing the spout and preventing the escape of steam from the vessel, so the beverage will not cool rapidly while the teapot is standing. By rotating the cover. C′, the shallowest part of the flange may be brought next the entrance of the spout, thus leaving room for outflow of liquid in pouring. If desired, the cover may be externally marked in an appropriate manner to indicate its proper positions for pouring and for standing idle. In other respects, the teapot of Figs. 3 and 4 may be similar to the one illustrated in Figs. 1 and 2.

The container may be provided with any suitable means for holding it. In Fig. 2 I have shown a metal holder H adapted to receive the vessel, the holder being provided with a suitable handle 17. In another arrangement within the scope of the invention, the container has a handle 17ª rigidly secured to it, as shown in Figs. 3 and 4. Where such a handle is to be employed, it is advantageous to make the handle solid, as shown in Figs. 4 and 5, this handle having indentations 18, 19, on opposite sides to fit the thumb and fingers as will be clear from the section, Fig. 5. Such a handle has a broad bearing where it joins the body of the pot and hence is not readily broken off. Further its shape is such that it burns uniformly in the kiln, without any appreciable loss, and is not readily broken in use.

While I have shown and described specific embodiments of my invention, it is to be understood that various structural features thereof may be changed without departing from the spirit of the invention.

What I claim is:

1. A liquid container of the character described having an open top or mouth, a pouring outlet adjacent and accessible through said mouth, and a removable cover fitting said mouth, the inclination of the rim of said mouth being such that the cover will be retained in place even when the container is tilted to drain the contents thereof.

2. A teapot or the like having an open top or mouth, the plane of the rim of said mouth being inclined to and intersecting the vertical axis of the teapot, and a pouring outlet accessible through said mouth adjacent the highest part of said rim, the lower edge of said rim being at a lower level than the lower edge of said pouring outlet.

3. A liquid container comprising a substantially elliptical container having a pouring lip on its broader side and a substantially circular mouth disposed in a plane inclined to the vertical axis of the container, said pouring lip being on the side having the higher edge, and a substantially circular cover fitting said mouth.

4. A teapot or the like having an open top or mouth, the plane of said mouth being inclined to and symmetrical with the axis of the teapot, and a short pouring spout near to and accessible through said mouth, said spout extending downwardly and away from the adjacent wall of the container.

5. A teapot or the like comprising a substantially elliptical container having a pouring outlet on its broader side and a substantially circular mouth disposed in a plane inclined to the vertical axis of the container, said pouring outlet being on the side having the higher edge, and a substantially circular cover fitting said mouth and rotatable thereon, said cover having a depending flange adapted to overlap said outlet only when the cover is in a predetermined position on said mouth.

6. A teapot or the like comprising a substantially elliptical container having a pouring outlet on its broader side and a mouth or open top whose edges slope from front to rear of said container, said pouring outlet being on the front side and a removable cover fitting said mouth, said cover having a depending flange adapted to overlap said outlet only when the cover is in a predetermined position on said mouth.

7. A teapot comprising an upwardly flaring vessel having a substantially elliptical cross-section and an open top providing a substantially circular mouth, the plane of said mouth being inclined to and symmetrical with the vertical axis of the teapot, a pouring spout adjacent said mouth, said spout extending downwardly and away from said vessel and being accessible through said mouth, the under side of said spout being inclined downwardly from the vessel and the lower edge of the rim of the mouth of the vessel being at a lower level than the junction of said pouring spout with the vessel, and a substantially circular cover for said vessel having a rim on the under side thereof fitting within the mouth of the vessel.

In testimony whereof I hereunto affix my signature.

FRITZ LOWENSTEIN.